United States Patent
Takahashi

[11] Patent Number: 6,164,576
[45] Date of Patent: Dec. 26, 2000

[54] REEL FOR FISHING WHICH STABLY AND EASILY PERFORMS FISHING OPERATIONS WITHOUT IMPARTING SHOCK TO FISHING LINE

[75] Inventor: Hideaki Takahashi, Hoya, Japan

[73] Assignee: Daiwa Seiko, Inc., Tokyo, Japan

[21] Appl. No.: 09/339,099

[22] Filed: Jun. 24, 1999

[30] Foreign Application Priority Data

Jun. 26, 1998 [JP] Japan .................................. 10-180457

[51] Int. Cl.[7] ................................................ A01K 89/033
[52] U.S. Cl. ............................................. 242/271; 242/295
[58] Field of Search .................................. 242/271, 295, 242/298, 303, 247, 268

[56] References Cited

U.S. PATENT DOCUMENTS

| | | | |
|---|---|---|---|
| 4,738,410 | 4/1988 | Yamaguchi | 242/271 |
| 5,020,738 | 6/1991 | Yamaguchi | 242/247 |
| 5,292,087 | 3/1994 | Sato | 242/268 |
| 5,322,240 | 6/1994 | Sato | 242/295 |
| 5,570,851 | 11/1996 | Yamguchi et al. | 242/247 |
| 5,921,492 | 7/1999 | Bauer | 242/295 |

FOREIGN PATENT DOCUMENTS

| | | |
|---|---|---|
| 63-43902 | 11/1988 | Japan . |
| 4-51585 | 12/1992 | Japan . |
| 9-168354 | 6/1997 | Japan . |

*Primary Examiner*—Katherine A. Matecki
*Attorney, Agent, or Firm*—Oblon, Spivak, McClelland, Maier & Neustadt, P.C.

[57] ABSTRACT

The fishing reel includes a spool supported rotatably between right and left side plates of the main body of the reel, a drag disk rotatable to be cooperative with the rotation of the handle, a drag mechanism provided between the drag disk and the spool, and an adjustment unit for increasingly/decreasingly adjusting the frictional coupling force acting between the drag disk and the spool via the drag mechanism. Between the drag disk and the left side plates, the first reverse rotation prevention device of a ratchet type and the second reverse rotation prevention device of a one-directional clutch type, are provided so as to prevent the rotation of the spool in a fish line throwing direction.

1 Claim, 3 Drawing Sheets

REEL FOR FISHING WHICH STABLY AND EASILY PERFORMS FISHING OPERATIONS WITHOUT IMPARTING SHOCK TO FISHING LINE

BACKGROUND OF THE INVENTION

The present invention relates to a reel for fishing.

As disclosed in, for example, Jpn. U.M. KOKOKU Publication No. 63-43902 or Jpn. U.M. KOKOKU Publication No. 4-51585, a reel for fishing, including a drag mechanism for pulling up large fish, is conventionally known.

The fishing reel has an operational structure in which a drag operation lever is rotated so as to adjust the contact pressure of the drag disk with respect to the spool, thus increase/decrease the drag force. Further, when a larger force than the drag force acts on the spool, a reverse rotation preventing mechanism for preventing the rotation of the spool in the fish line throwing direction (that is, reverse rotation of the spool), operates.

The reverse rotation preventing mechanism include a ratchet which rotates integrally with a drag disk and a stopper placed to be engageable with the ratchet and supported by the main body of the reel. With this structure, when the spool is about to reverse rotation, the stopper is engaged with the ratchet to prevent the reverse rotation of the spool.

In the meantime, in a conventional fishing reel, when the reverse rotation preventing mechanism operates, a shock which has a magnitude corresponding to the play of the ratchet relative to the stopper, acts on the fishing line because the amount of play of the ratchet is large. When such a shock acts on the fishing line, a fishhook may release from fish which has been hooked, or the line may be broken. Or it is no longer possible to perform a fine operation of the fishing rod, which is required when fish is hooked on, in a stable and accurate manner.

Further, when the degree of the play of the ratchet in such a reverse rotation preventing operation is larger, a play is also created for the rotation of the handle by a corresponding degree, and therefore the fishing operation cannot be stably and easily performed.

BRIEF SUMMARY OF THE INVENTION

The present invention has been proposed to solve the conventional problem described above, and the object thereof is to provide a reel for fishing, which is capable of performing a fishing operation stably and easily without imparting a shock to the fish line.

Additional objects and advantages of the invention will be set forth in the description which follows, and in part will be obvious from the description, or may be leaned by practice of the invention. The objects and advantages of the invention may be realized and obtained by means of the instrumentalities and combination and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A reel for fishing, according to an embodiment of the present invention will now be described with reference to accompanying drawings.

Figure 1:
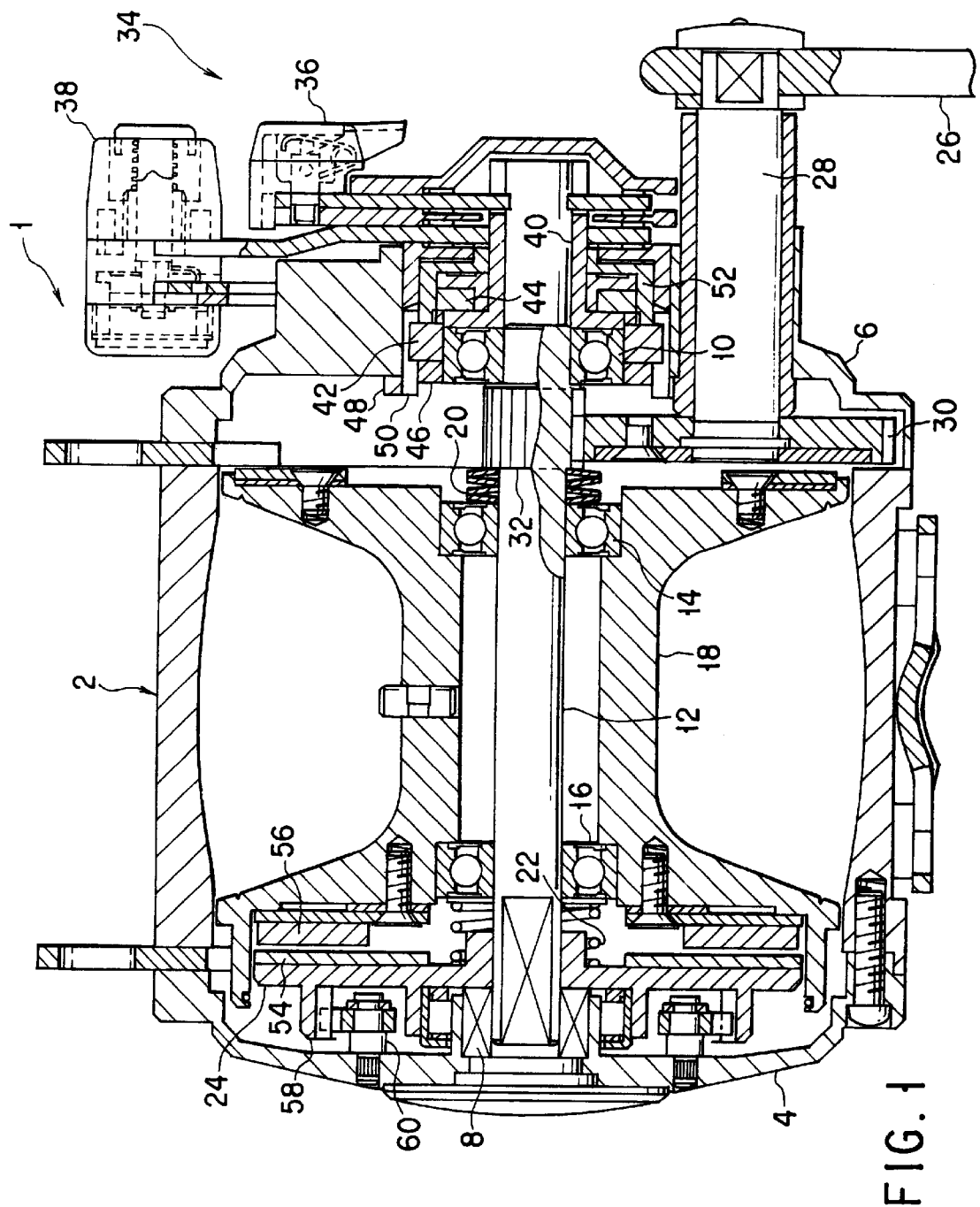
FIG. 1 is a view showing the structure of a reel for fishing, according to an embodiment of the present invention.

As shown in FIG. 1, a fishing reel 1 includes a main body 2, and right and left side plates 4 and 6 formed to be integral with the reel main body 2. Between the right and left side plates 4 and 6, a spool shaft 12 is supported rotatably by a left bearing 8 and a right bearing 10. The left bearing 8 is aligned and fixed to the left side plate 4 of the reel main body 2, and the right bearing 10 is movably provided on the right side plate 6 of the reel main body 2. The spool shaft 12 is set to be movable in an axial line direction together with the right bearing 10 as a force is applied to the right bearing 10 in a direction along the axial line direction (of the spool shaft 12).

To the spool shaft 12, a spool 18 is rotatably mounted via first and second bearings 14 and 16, and the spool 18 is position and urged at a predetermined position by first and second urging members 20 and 22 provided respectively onto the first and second bearings 14 and 16 from outer sides. The first urging member 20 is interposed between the first bearing 14 and the spool shaft 12, and the second urging member 22 is interposed between the second bearing 16 and a drag disk 24, which will be later explained.

As mentioned above, when a force acting along the axial direction (of the spool shaft 12) is applied to the right bearing 10, the spool shaft 12 moved in the axial direction together with the right bearing 10. The urging force which corresponds to the amount of the movement of the spool shaft 12 is transmitted from the first urging member 20 to the spool 18 via the first bearing 14. Consequently, the spool 18 moves along axial direction towards the drag disk 24 explained later.

The drag disk 24 is fixed to the spool shaft 12 on the left side plate 4 such that the disk is rotatable in the fish line winding direction (forward rotation of the spool) as the handle 26 is rotated. The handle 26 is coupled with a drive gear 30 via a handle shaft 28, and the drive gear 30 is geared with a pinion 32 mounted on the spool shaft 12 on the right side plate 6. With this structure, as the handle 26 is rotated, the spool shaft 12 is driven via the drive gear 30 and the pinion 32, to rotate, and thus the drag disk 24 rotates as well.

Between the drag disk 24 and the spool 18, a drag mechanism including a friction plate 54 fixed to the drag disk 24 and a lining member 56 fixed to the spool 18 to face the friction plate 54, is provided. The drag force applied to the spool 18 is adjusted by increasing or decreasing the frictional force acting between the friction plate 54 and the lining member 56 of the drag mechanism.

The adjustment of the drag force by the drag mechanism is performed by an adjustment unit 34 provided on the right side plate 6 side of the main body of the reel. The adjustment unit 34 includes a fine-adjustment drag lever 36 for finely adjusting the frictional force acting between the drag disk 24 and the spool 18, and a rough-adjustment drag lever 38 for roughly adjusting the frictional force between the drag disk 24 and the spool 18.

The fine-adjustment drag lever 36 is connected to a cylindrical member 40 disposed to abut on the right bearing 10, and the front surface (the surface facing the spool) of cylindrical member 40 abuts on the right bearing 10, and a fine-adjustment cam surface (not shown) is formed on its rear surface.

On the outer side of the right bearing 10 and the cylindrical member 40, a bearing case 46 which has an outward pin 42 and an inward pin 44 is provided. The outward pin 42 projects from the bearing case 46 to the outside, whereas the inward pin 44 projects from the case 46 to the interior. The inward pin 44 thus abuts on the fine-adjustment cam surface of the cylindrical member 40.

To surround the bearing case 46, a bearing cylinder 48 which is fixed not to rotate, to the right side plate 6, and an engagement groove 50 which extent along the axial direction of the spool shaft 12 is made in the bearing cylinder 48. The outward pin 42 of the bearing case 46 engages with the engagement groove 50 so as to be slidable in the axial direction.

The rough-adjustment drag lever 38 is connected a cam cylinder 52 inserted between the bearing case 46 and the bearing cylinder 48. A cam surface (not shown) is formed on its front surface of the cam cylinder 52, and the outward pin 42 of the bearing case 46 abuts on the cam surface.

The following is an explanation of the function of the adjustment unit 34 having the fine- and rough-adjustment mechanisms described above.

As the rough-adjustment drag lever 38 is rotated, the cam cylinder 52 rotates by an amount corresponding to the rotation amount of the drag lever, and the cam surface formed on the front surface of the cam cylinder 52 presses the outward pin 42 to the spool side. During this operation, the outward pin 42 slides along the engagement groove 50 of the bearing cylinder 48, and therefore the bearing case 46 moves in the axial direction together with the outward pin 42. When the bearing case 46 moves, the inward pin 44 of the bearing case 46 presses the rear surface (that is, the fine-adjustment cam surface) of the cylindrical member 40, and therefore the cylindrical member 40 moves along the axial direction. As the cylindrical member 40 moves, the front surface of the cylindrical member 40 presses the right bearing 10 to the spool side.

Thus, when the right bearing 10 moves in the axial direction together with the spool shaft 12, the urging force corresponding to the amount of the movement of the spool shaft 12 is propagated to the spool 18 from the first urging member 20 through the first bearing 14. As a result, the spool 18 moves in the direction to approach the drag disk 24 along the axial direction, and the frictional force between the friction plate 54 and the lining member 56 is increasingly/decreasingly adjusted (rough adjustment).

As the fine-adjustment drag lever 36 is rotated, the cylindrical member 40 rotates by an amount corresponding to the rotation amount of the drag lever. Therefore, the inner pin 44 of the bearing case 46 directly act, with its pressing force, on the fine-adjustment cam surface formed on the rear surface of the cylinder 40, so as to move the cylindrical member 40 in the axial direction. As the cylindrical member 40 moves, the front surface of the cylindrical member 40 presses the right bearing 10 to the spool side.

Thus, when the right bearing 10 moves in the axial direction together with the spool shaft 12, the urging force corresponding to the amount of the movement of the spool shaft 12 is propagated to the spool 18 from the first urging member 20 through the first bearing 14. As a result, the spool 18 moves in the direction to approach the drag disk 24 along the axial direction, and the frictional force between the friction plate 54 and the lining member 56 is increasingly/decreasingly adjusted (fine adjustment).

Figure 3:
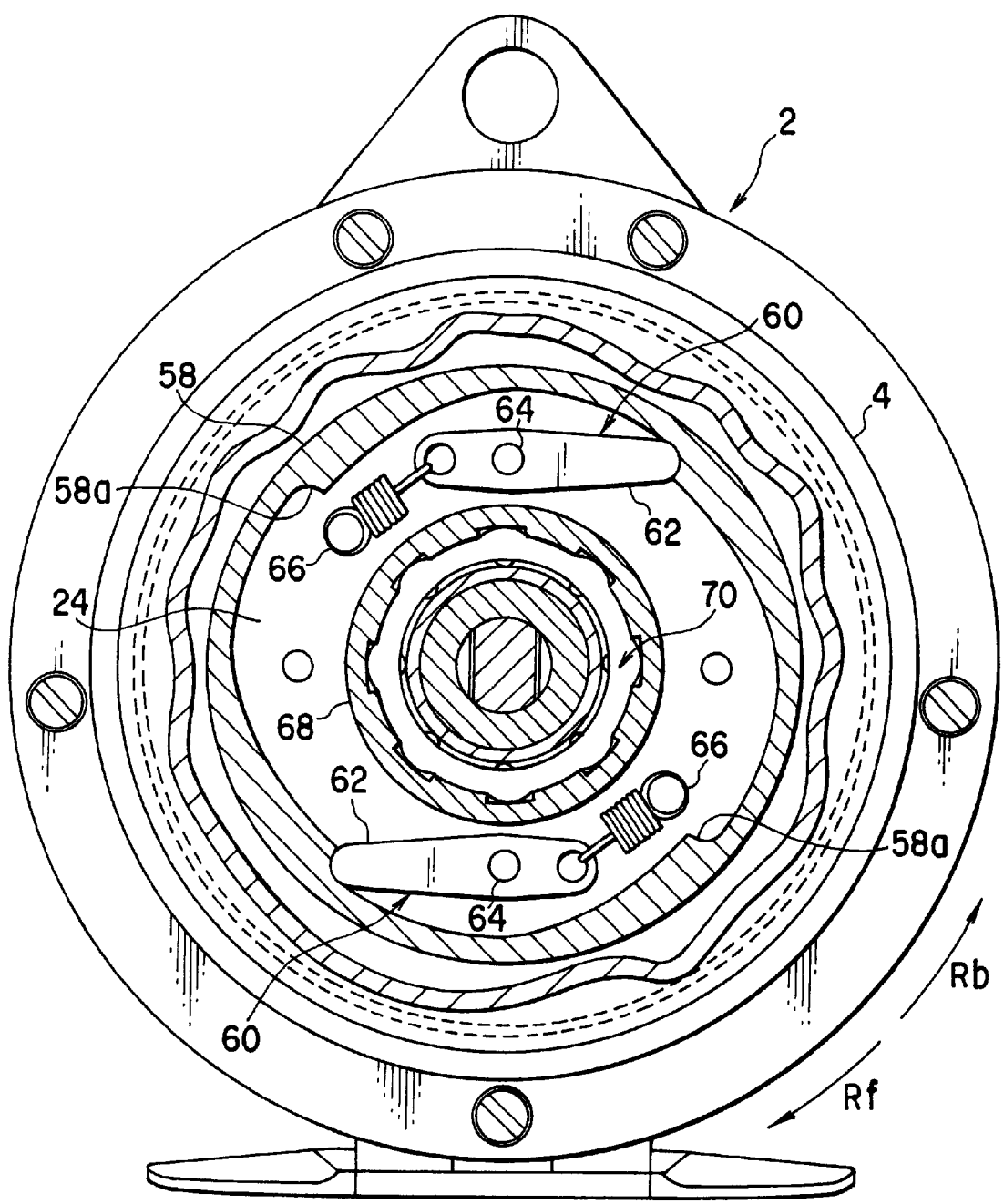
FIG. 3 is a cross sectional view taken along the line III to III in FIG. 2.

While in the state where the drag force for hooking fish up is roughly and finely adjusted by the drag mechanism, when the handle 26 is rotated, the rotational movement is transmitted to the drag disk 24 via the handle shaft 28 so as to rotate the drag disk 4 in the fish line winding direction Rf (see FIG. 3). Further, as the rotational movement is transmitted to the spool 18 via the drag mechanism, the spool 18 is rotated in the fish line winding direction Rf. As a result, the fish line (not shown) is wound around the spool 18 while maintaining a desired drag force.

Further, in the fishing reel of the present invention, a reverse rotation prevention mechanism for preventing the spool 18 from rotating in the fish line throwing direction (reverse rotation) is provided between the drag disk 24 and the left side plate 4. The reverse rotation prevention mechanism is capable of preventing the reverse rotation of the spool 18 when the drag force has been adjusted as described above and an excessive force over the drag force acts on the spool, in accordance with the degree of the play corresponding to the drag force or the tug by fish being hooked.

Figure 2:
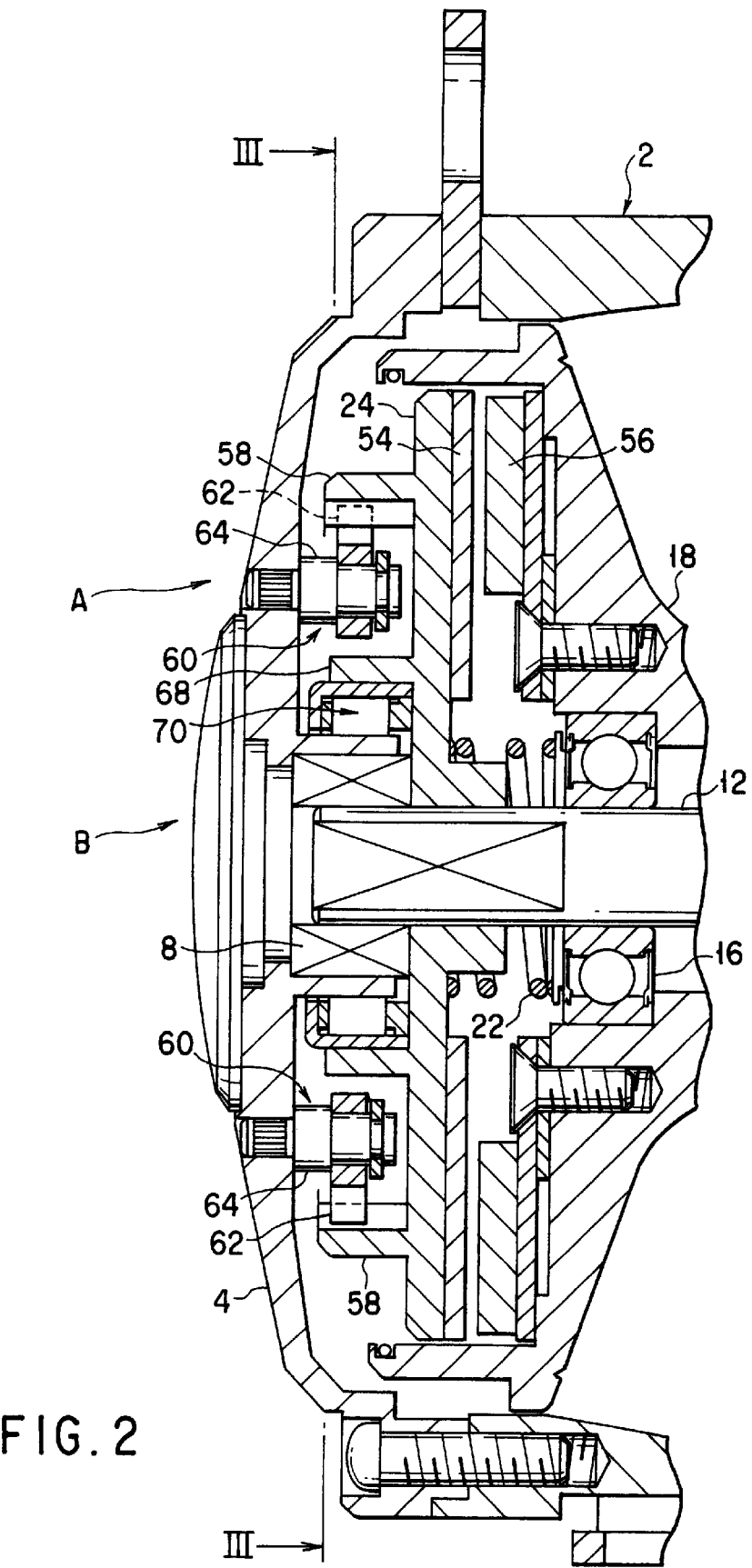
FIG. 2 is an enlarged view showing the structure of a reverse rotation preventing mechanism, applied to the reel for fishing, according to the embodiment.

As can be seen in FIGS. 2 and 3, the reverse rotation prevention mechanism applied to this embodiment includes a first reverse rotation prevention device A of a ratchet type and a second reverse rotation prevention device B of a one-directional clutch type. The first and second reverse rotation prevention devices are both provided between the drag disk 24 and the left side plate 4.

The first reverse rotation prevention device A is situated at a position substantially concentrical with respect to the center of the rotation of the drag disk 24 and the second reverse rotation prevention device B is situated within the first reverse rotation prevention device, at a position substantially concentrical with respect to the center of the rotation of the drag disk 24.

More specifically, the first reverse rotation prevention device includes a ratchet 58 projecting from the left side surface (the surface facing the left side plate 4) of the drag disk 24, and at least one engagement member 60 provided on the left side plate 4 to be rotatable and engageable with the ratchet.

The ratchet 58 has a plurality of engagement portions 58a formed at predetermined intervals, for regulating the rotation of the ratchet 58 when it rotates in the Rb direction. The engagement member 60 has a stopper 62 supported rotatably by a support shaft 64 fixed to the left side plate, and the tip end of the stopper 62 is made engageable with an engagement portion 58a of the ratchet. To the proximal portion of the stopper 62, an urging spring 66 is coupled, and thus the tip end of the stopper 62 is set in pressure-contact with the ratchet 58 by the urging spring 66 all times. One end of the urging spring 66 is fixed to the proximal portion of the stopper 62 and the other and is fixed to the left side plate 4.

The second reverse rotation prevention device B includes a hold cylinder 68 projecting from the left side surface (the surface facing the left side plate 4) of the drag disk 24, and a rolling-type one directional clutch 70 held in the hold cylinder 68. The rolling type one directional clutch 70 serves to inhibit the drag disk 24 from rotating in the Rb direction by the wedge effect, but allow the rotation in the Rf direction (forward rotation) In other words, the drag disk 24 is set freely rotatable in the fish line winding direction Rf, bat it cannot rotate in the spool reverse rotation direction Rb. In this case, due to the wedge effect of the rolling type one directional clutch 70, the rotation of the drag disk 24 in the direction Rb is prohibited in a state where the degree of play is small (the reverse rotation play degree is small).

With the reverse rotation prevention mechanism described above, during a fish line winding operation, the rolling type one directional clutch 70 is set in free rotation state and the tip end of the stopper 62 is set in a slidable contact along the ratchet 58, and therefore the drag disk 24 can rotate in the fish line winding direction Rf without being restricted. As a result, the fish line (not shown) is wound up around the spool 18.

In the meantime, when a force excessive to the drag force acts on the spool 18, the above-described reverse rotation prevention mechanism operates to inhibit the reverse rotation of the spool 18 (the drag disk 24). More specifically, in the case where the tug by fish at the line is relatively light (the tase of a small load), the rolling type one directional clutch 70 (the second reverse rotation prevention device B) which cannot withstand a heavy load but has a small degree of a play in the direction Rb, operates with priority. In this operation, the rotation of the spool 18 (the drag disk 24) in the direction Rb is inhibited by the rolling type one-directional clutch 70.

In the case where the tug by the fish tit the line is relatively heavy (the case of a heavy load), the first reverse rotation prevention device A of the ratchet type which can fully withstand a heavy load operates as a reinforcement. During this operation, the tip end of the stopper 62 engages with an engage portion 58a of the ratchet 58, thereby inhibiting the rotation of the spool 18 (the drag disk 24) in the direction Rb.

As described above, according to this embodiment, with the first and second reverse rotation prevention devices, the reverse rotation of the spool 18 (the drag disk 24) can be prevented smoothly and surely with the optimal degree of the reverse rotation play, which corresponds to the drag force, the tug by fish being hooked, or the like. As a result, it becomes possible to prevent fish from getting off the hook or the fish line from being broken, due to the shock which occurs during the reverse rotation preventing operation. Therefore, the fine rod operation, which is required when fish is hooked, can be carried out stably and accurately, and thus the fishing operation can be stably and easily carried out.

Further, according to this embodiment, the first and second reverse rotation prevention devices are disposed between the drag disk 24 and the left side plate 4 in an integrated manner, and therefore the fishing reel can be made compact and well-balanced in structure as a whole.

Furthermore, the first reverse rotation prevents device is placed at a position substantially concentrical to the center of the rotation of the drag disk 24 and further the second reverse rotation prevention device is placed on the inner side of the first reverse rotation prevention device at a position substantially concentrical to the center of the rotation of the drag disk 24. With this structure, the reverse rotation prevention mechanism can be made in small size with respect to the axial direction (the axial direction of the spool shaft 12), band therefore the fishing reel can be made further compact.

Additional advantages and modifications will readily occur to those skilled in the art. Therefore, the invention in its broader aspects is not limited to the specific details and representative embodiments shown and described herein. Accordingly, various modifications may be made without departing from the spirit or scope of general invention concept as defined by the appended claims and their equivalents.

What is claimed is:

1. A fishing reel comprising:

a spool shaft supported rotatably between right and left side plates of a main body of said fishing reel;

a spool supported rotatably by said spool shaft;

a handle shaft connected to said spool shaft via a gear mechanism, wherein said handle shaft is equipped with a handle;

a drag mechanism having a drag disk which is provided with said spool shaft and is rotatable as said handle is rotated, and an adjustment unit for adjusting a frictional coupling force generated between a first side surface of said drag disk and said spool by changing a distance between said drag disk and said spool in an axial direction, wherein a second side surface of said drag disk is provided with a first reverse rotation prevention device and a second reverse rotation prevention device so as to prevent rotation of said spool in a fishing line casting direction, said first reverse rotation prevention device being equipped with a ratchet arranged on said second side surface of said drag disk at an outward position in a radial direction and a stopper engagable with said ratchet, and said second reverse rotation prevention device being equipped with an one-directional clutch for tolerating rotation of said drag disk in a fishing line winding direction and preventing rotation of said drag disk in said fishing line casting direction, said clutch being arranged on said second side surface of said drag disk in said radial direction at an inward position with respect to said first reverse rotation prevention device.

* * * * *